Nov. 29, 1966 J. A. WATKINS 3,289,199

BINARY CODE CONVERTER

Filed Dec. 20, 1965 8 Sheets-Sheet 1

INVENTOR.
JOHN A. WATKINS

BY

Weingarten, Orenbuch & Lahive

ATTORNEYS

INVENTOR.
BY JOHN A. WATKINS
Weingarten, Orenbuch & Lahive
ATTORNEYS

Nov. 29, 1966 J. A. WATKINS 3,289,199

BINARY CODE CONVERTER

Filed Dec. 20, 1965 8 Sheets-Sheet 3

INVENTOR.

BY JOHN A. WATKINS

Weingarten, Orenbuch & Lahive

ATTORNEYS

| | BINARY CODE | | | |
|---|---|---|---|---|
| | $2^3$ | $2^2$ | $2^1$ | $2^0$ |
| DECIMAL | F WINDING | DE WINDINGS | BC WINDINGS | A WINDING |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 1 |
| + | 1 | 1 | 0 | 1 |
| − | 1 | 1 | 1 | 0 |

INVENTOR.
BY JOHN A. WATKINS
Weingarten, Orenbuch & Lahive
ATTORNEYS

Nov. 29, 1966 J. A. WATKINS 3,289,199

BINARY CODE CONVERTER

Filed Dec. 20, 1965 8 Sheets-Sheet 5

INVENTOR.

BY JOHN A. WATKINS

Weingarten, Orenbuch & Lahive

ATTORNEYS

Nov. 29, 1966 J. A. WATKINS 3,289,199

BINARY CODE CONVERTER

Filed Dec. 20, 1965 8 Sheets-Sheet 6

INVENTOR.

BY JOHN A. WATKINS

Weingarten, Orenbuch & Lahive

ATTORNEYS

Nov. 29, 1966 J. A. WATKINS 3,289,199

BINARY CODE CONVERTER

Filed Dec. 20, 1965 8 Sheets-Sheet 7

INVENTOR.

BY JOHN A. WATKINS

Weingarten, Orenbuch & Lahive

ATTORNEYS

INVENTOR.
BY JOHN A. WATKINS
Weingarten, Orenbuch & Lahive
ATTORNEYS 3,289,199
BINARY CODE CONVERTER

John A. Watkins, Cheshire, Conn., assignor to The Patent Button Company, Waterbury, Conn., a corporation of Connecticut Filed Dec. 20, 1965, Ser. No. 515,004
8 Claims. (Cl. 340—347)

This invention relates in general to apparatus for converting from one numeric system to a different numeric system. More particularly, the invention pertains to devices for converting coded electrical signals into a decimal display and resides in an electromagnetic indicator arranged to respond to binary coded electrical signals by displaying the symbol in the decimal system that is equivalent to the value of the binary coded signals.

The conventional electromagnetic indicator that is capable of displaying the ten decimal symbols, i.e. 0, 1, 2, 3. . . 9, employs a stator having ten electromagnets. Each electromagnet is arranged to be separately energized by an electrical signal, and, in response to the electrical input, causes a different one of the decimal numerals to be displayed in the window of the indicator. As each electromagnet of the stator must be separately electrically energizable, the conventional decimal indicator has ten separate electrical inputs which must be coupled to the source of electrical signals in a manner that causes the correct decimal symbol to be displayed.

The invention contemplates the provision of a data readout device which converts binary coded signals into a decimal output. In a binary code, as the name indicates, each bit in the code can have but one of two values. In binary parlance, the two values are commonly designated ONE and ZERO; if the value of a bit is not ONE, it must be ZERO, as that is the only other permissible value. Where the code consists of a set of simultaneous electrical signals, each signal of the set is a "bit" and must have one or the other of the two permissible values. A binary ONE for example, can correspond to the presence of an electrical potential whereas the binary ZERO can correspond to the absence of an electrical potential.

The conventional ten input electromagnetic decimal indicator, when used in a situation where the electrical signals are coded in accordance with a binary system, requires the interposition of a decoding device to translate the binary signals into signals compatible with the input arrangement of the indicator. The decoding device, because of the time required to translate the electrical signals, introduces an undesirable lag in the conversion of the binary coded signals to a decimal display. From the viewpoint of reliability, a decoding device is undesirable because while the electromagnetic indicator is a mechanism having few parts that can fail, the decoding device usually has a multitude of components which may fail. Further, a decoding device, due to its complexity, tends to be expensive and in most cases costs more than the electromagnetic indicator itself.

United States Patent No. 3,218,625 discloses embodiments of a decimal indicating electromagnetic converter that responds to binary coded electrical signals without requiring the interposition of a decoding device to translate the binary signals into signals compatible with the indicator's input arrangement. The embodiments there described have stators arranged to accept the binary coded signals directly. In those embodiments, the stators are asymmetric structures, having either an asymmetric arrangement of radial poles, as in FIG. 7A of that patent, or an asymmetric arrangement of windings as in FIG. 9A. The operation of that electromagnetic converter depends principally upon the addition of magnetic field vectors as shown in FIG. 7B of the patent, to obtain the requisite number of discretely oriented magnetic fields.

The chief object of the invention here disclosed is to provide a decimal indicating electromagnetic converter that employs a symmetrical stator and yet responds directly to binary coded electrical signals. To achieve that objective, the operation of the electromagnetic converter is made to depend not only upon the addition of magnetic field vectors but also upon the subtraction of magnetic field vectors.

In one embodiment of the invention the indicator employs a drum affixed to a magnet to form a rotor that is mounted in a manner permitting the rotor to turn freely. The stator of the indicator is an electromagnetic structure having a plurality of windings arranged to respond to the binary coded electrical signals by establishing a magnetic field having a discrete orientation that is different for each different set of coded signals. For each different set of coded signals there is a corresponding symbol marked upon the drum of the rotor. The rotor's magnet, under the influence of the magnetic field established by the stator, turns until the magnet is aligned with the stator's magnetic field and thereby causes the symbol bearing drum to which the magnet is attached to rotate and assume a fixed position. A window is provided in a structure housing the rotor and stator, the window permitting only one of the symbols inscribed on the drum to be visible in its entirety. The symbols are located on the drum so that for each aligned position of the magnet, a symbol is displayed in the window.

The electromagnetic indicator of the invention utilizes a stator having windings arranged to establish discretely oriented magnetic fields in response to directly applied binary coded electrical signals. The windings of the stator are connected so that the discretely oriented magnetic fields established by the windings in response to some sets of signals are the resultant of additive magnetic field vectors; the discretely oriented magnetic fields established in response to other sets of signals are the resultant of subtractive magnetic field vectors; and the discretely oriented magnetic fields established in response to yet other sets of signals are the resultant of both additive and subtractive magnetic field vectors.

The invention, both as to its construction and mode of operation, can be better understood from the following exposition when considered in conjunction with the accompanying drawings in which.

Figures 3, 8, 12:
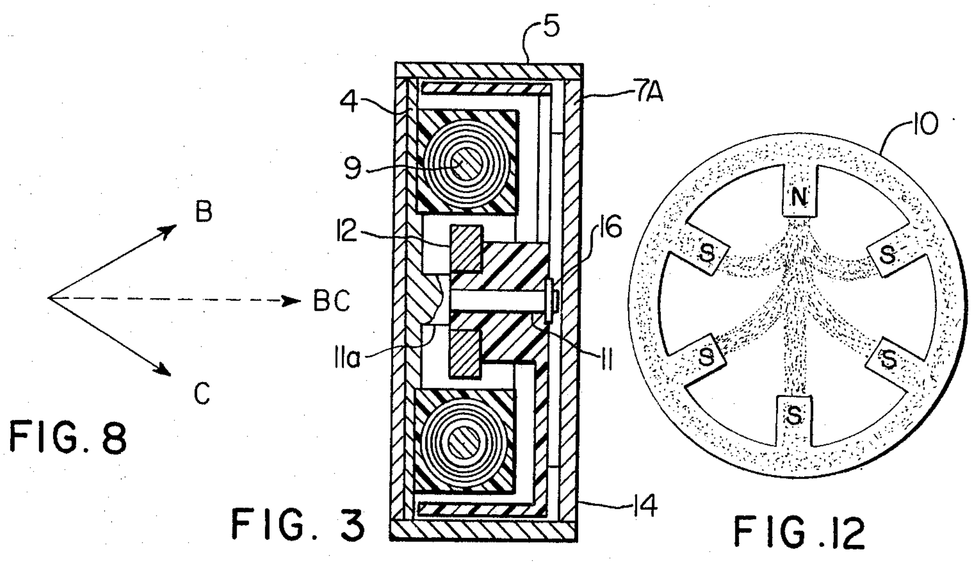
FIG. 3 is a sectional view of the embodiment taken along the plane 3—3 of FIG. 1.
Figure 11:
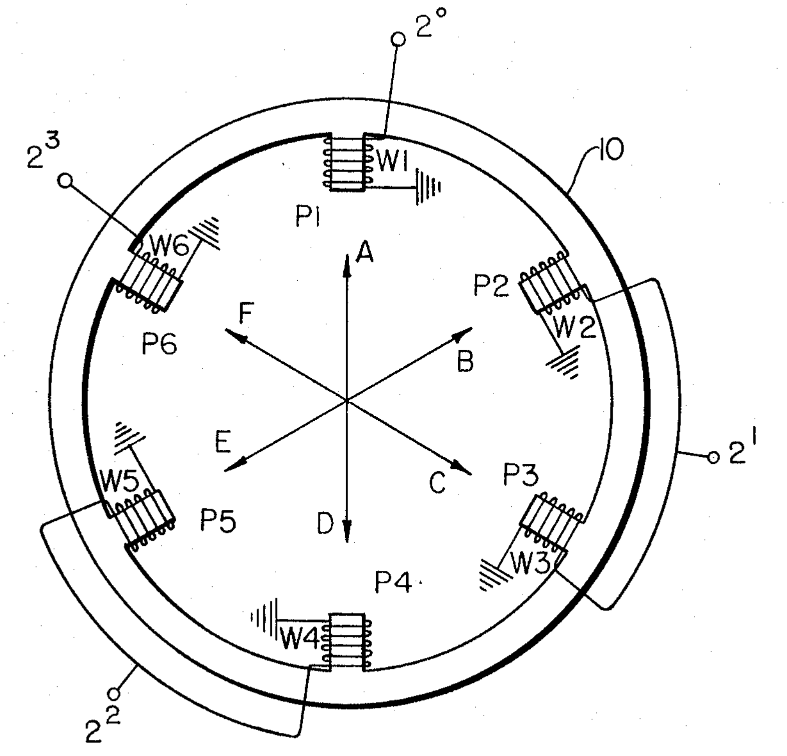
Figure 4:
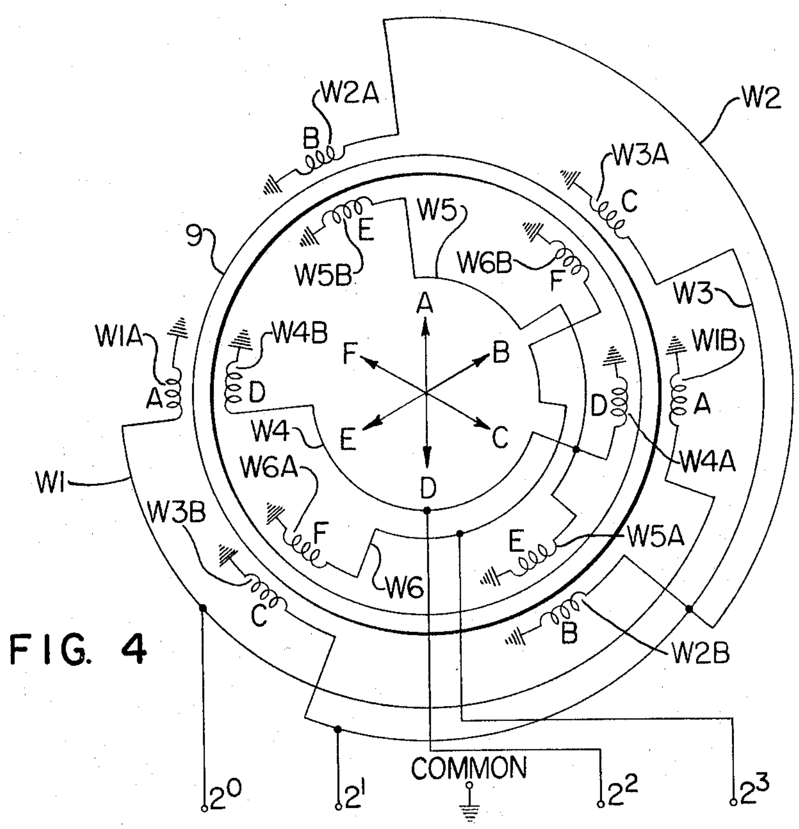
Figure 5:
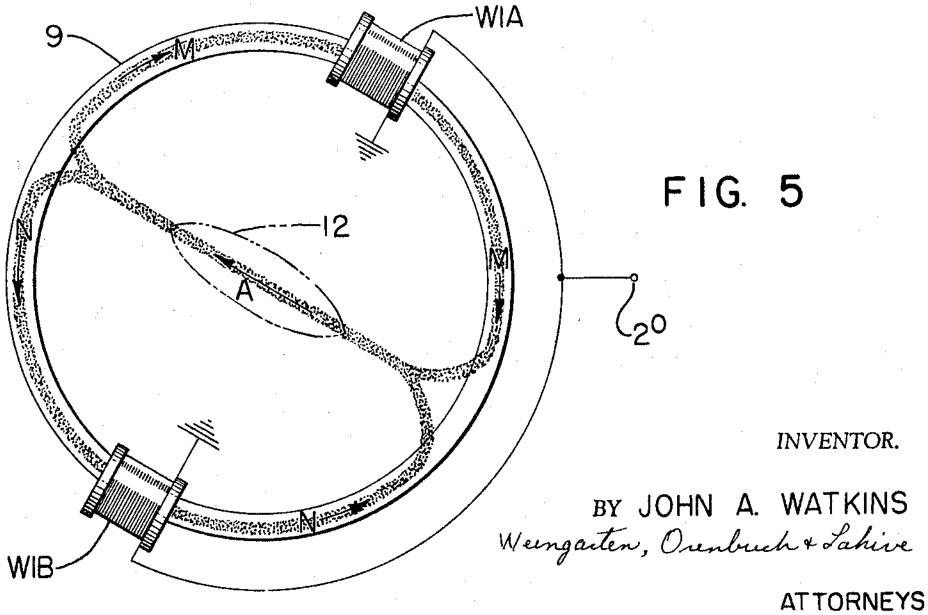
Figures 6, 7:
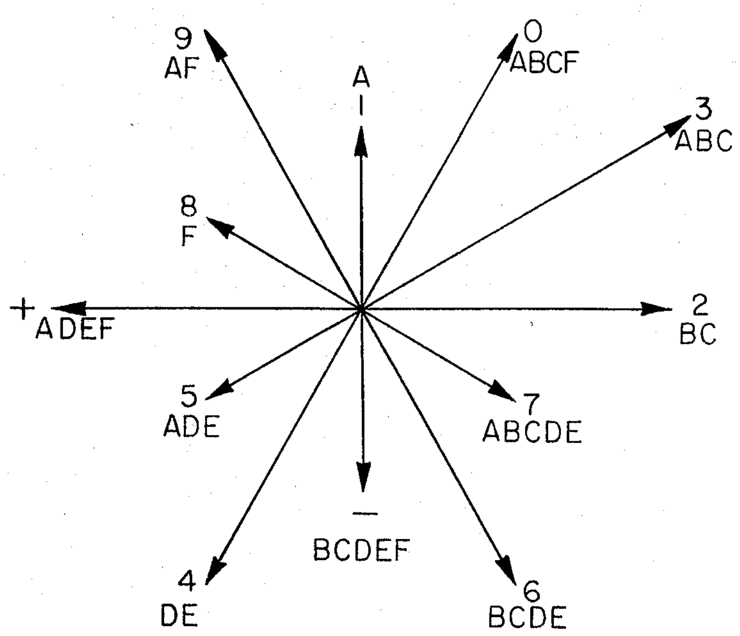
Figure 9:
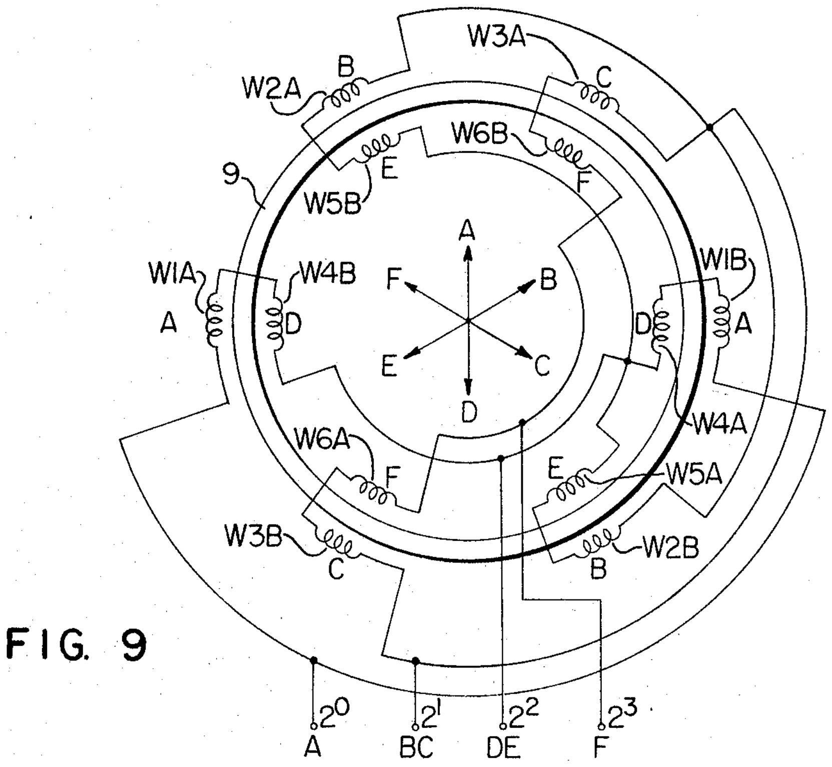
Figure 10:
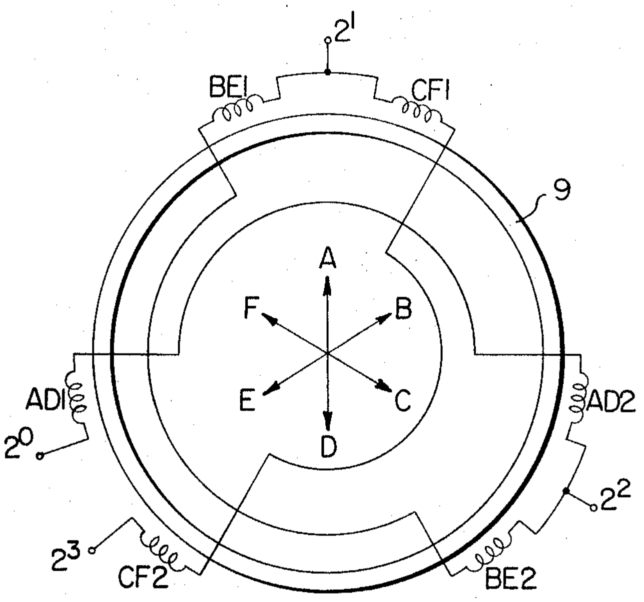
Figure 13:
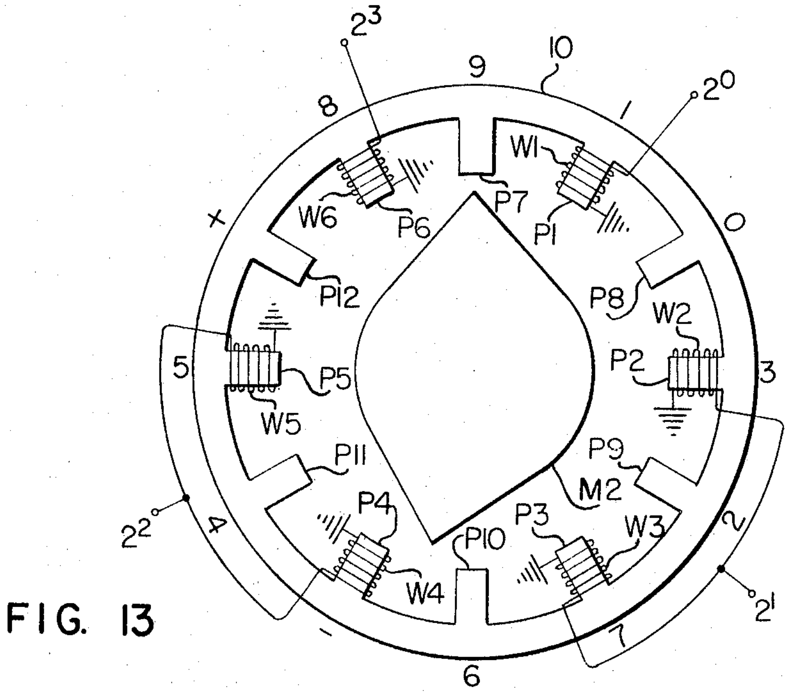
Figure 14:
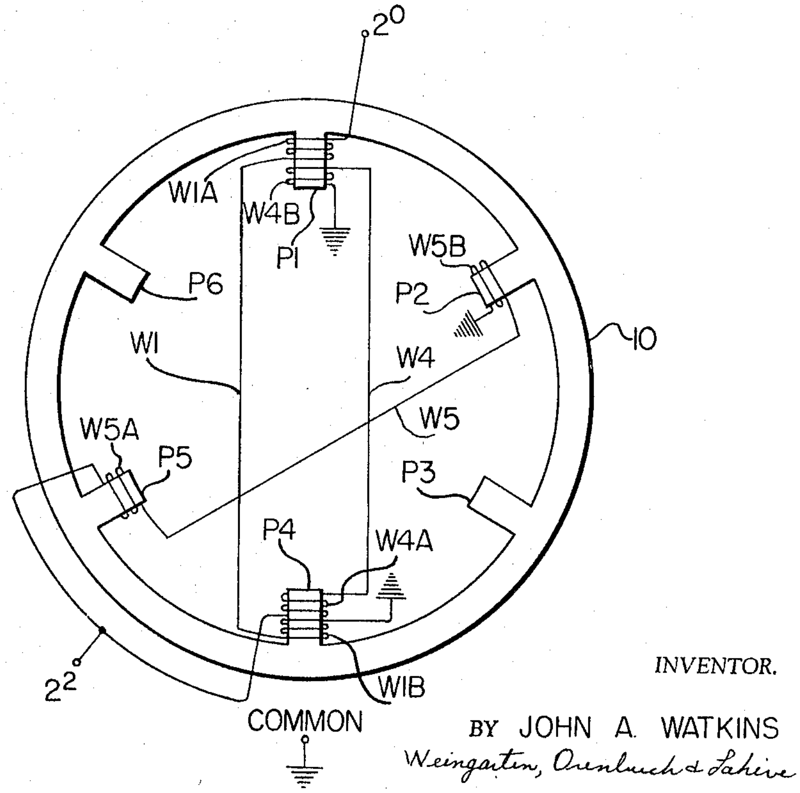
Figure 15:
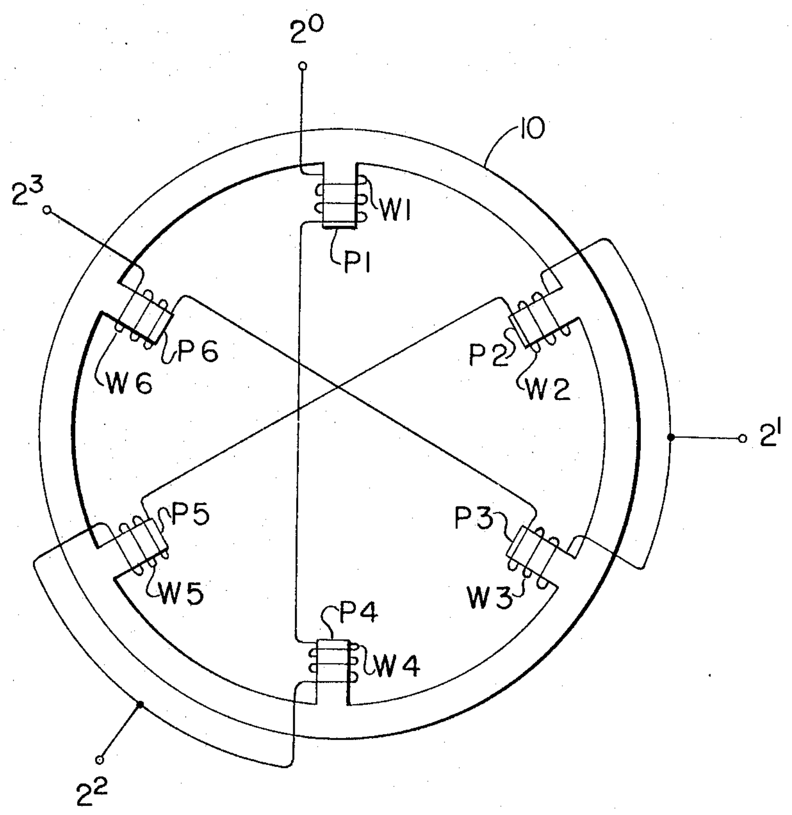
Figure 16A:
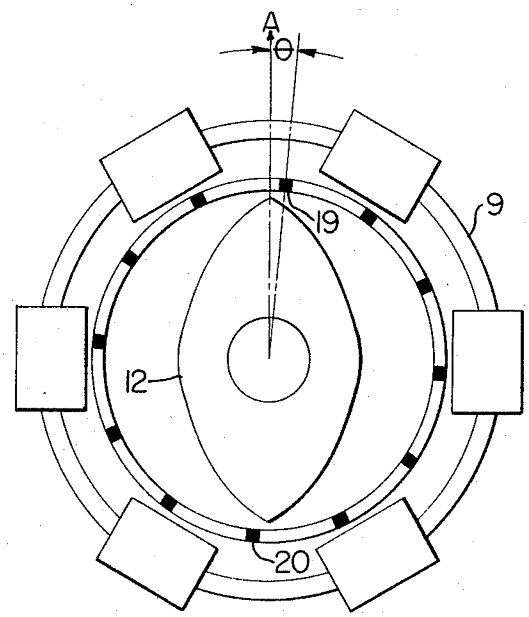
Figure 16B:
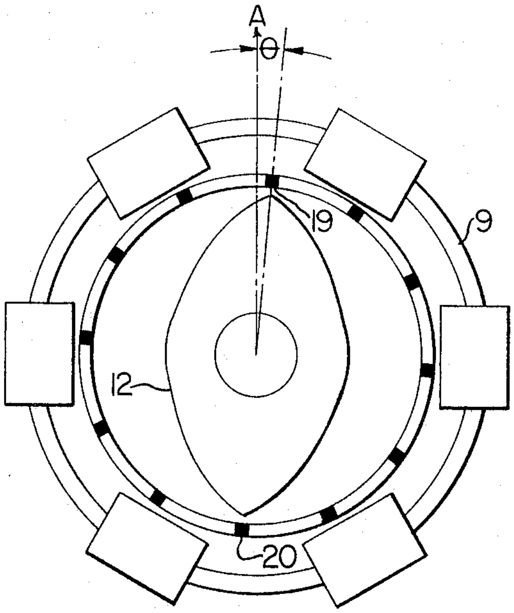

FIG. 4 schematically depicts a toroidal stator employed in the invention;

FIG. 5 shows a simplified toroidal stator employing a two section winding;

FIG. 6 tabulates the standard binary code with respect to its decimal equivalent values;

FIG. 7 is a vector diagram showing the vector of the magnetic field established when signals coded in accordance with the table of FIG. 6 are applied to the terminals of the FIG. 4 stator;

FIG. 8 is a vector diagram illustrating the manner in which two vectors may be added to produce a third resultant vector;

FIG. 9 depicts an alternative scheme for connecting the windings of the toroidal stator;

FIG. 10 depicts a scheme for serially connecting the windings of the toroidal stator to produce the same result as the FIG. 9 stator;

FIG. 11 schematically depicts a symmetrical radial pole stator that may be employed in place of the toroidal stator;

FIG. 12 is a diagram showing the magnetic field pattern established by energization of a winding of the radial pole stator;

FIG. 13 illustrates a stator having twelve radial poles in employment with a rotor utilizing a bent magnet;

FIG. 14 depicts a symmetrical radial pole stator employing windings having two sections arranged on diametrically opposite poles;

FIG. 15 depicts a scheme for connecting the windings of the radial pole stator to cause signal cancellation; and FIGS. 16A and 16B depict a toroidal stator employing magnetic detent pins.

Figures 1, 2:
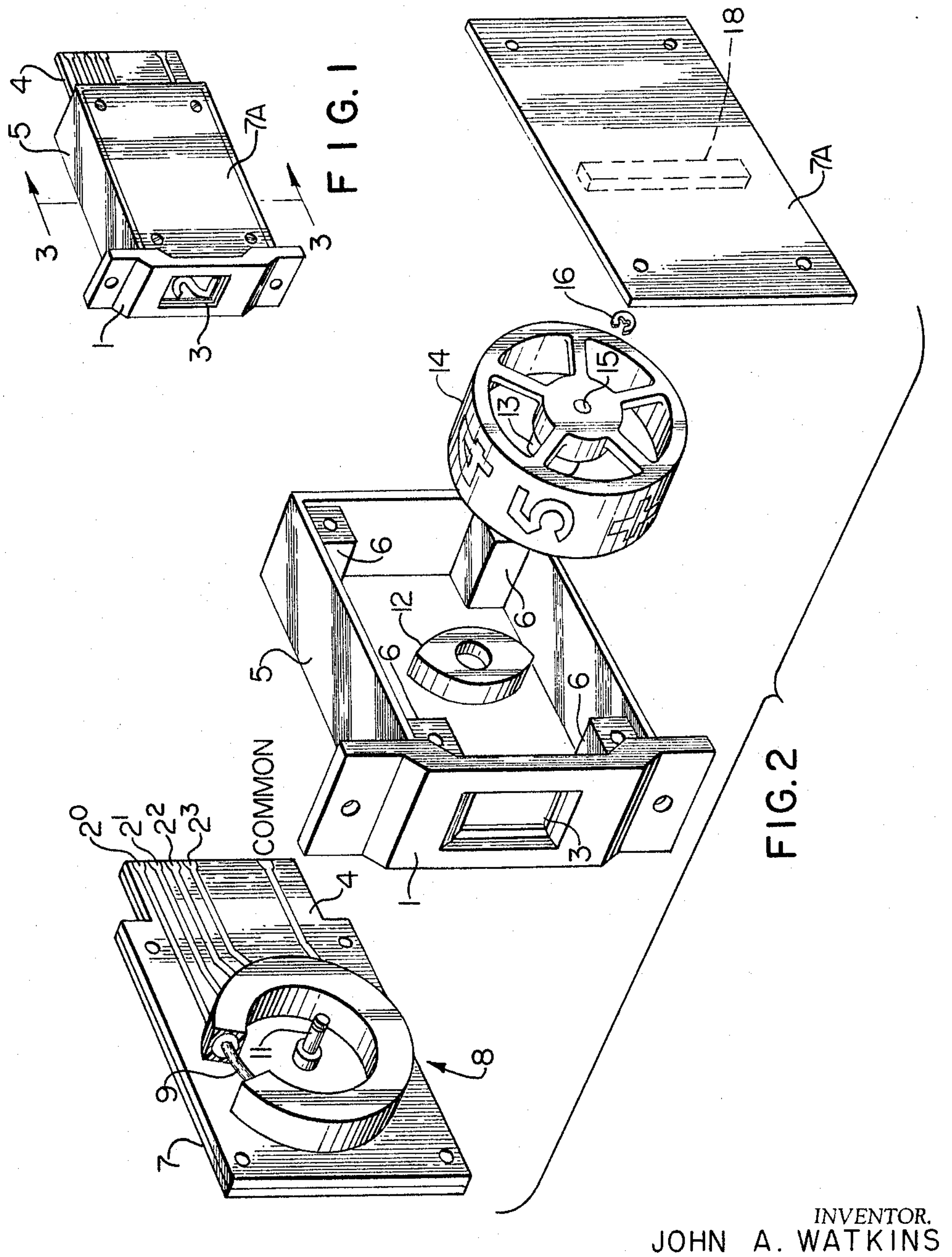
FIG. 1 depicts an embodiment of the invention in assembled form.
FIG. 2 is an exploded view of the embodiment showing its component parts.

The indicator depicted in FIG. 1 of the drawings employs a front panel 1 having a window 3 in which symbols, such as numerals, are displayed. Electrical signals are impressed upon the indicator through the terminals of a printed circuit board 4 that extends from the rear of the indicator housing. The terminals of the printed circuit board, as shown in FIG. 2, are designated $2^0$, $2^1$, $2^2$, $2^3$ and COMMON.

The housing, as illustrated in FIG. 2, employs a hollow rectangular body 5 having posts 6 at its corner. The front panel, preferably is an integral part of the body 5. The posts are internally threaded to permit end plates 7 and 7A to be secured to opposite sides of body 5 by screws which engage the threaded posts. Printed circuit board 4 has its wiring protected by an insulative coating and the board is preferably clamped against body 5 by end plate 7. As several indicators may be mounted side by side or an indicator may be used in an environment where external magnetic fields of appreciable strength are present, the end plates 7 and 7A, are, preferably, fabricated of a material of high magnetic permeability to act as magnetic shields. Secured to circuit board 4 is a stator 8 having an annular ferromagnetic core 9 carrying a plurality of electro-magnetic windings. The windings and the core are preferably embedded in a plastic matrix which fixes the windings in place and aids in transferring heat away from the windings. The core and its embedded windings form a toroidal stator whose purpose is to establish any one of a plurality of discretely oriented magnetic fields.

Secured to circuit board 4 and extending through the geometric center of toroidal stator 8 is a shaft 11. In the assembled apparatus, depicted in FIG. 3, a rotor is mounted to turn about the shaft. The rotor shown in FIGS. 2 and 3 employs a permanent magnet 12 attached to the hub 13 of a drum 14. The periphery of the drum is marked with the symbols that are to be displayed in the window of the indicator. Usually the symbols are alpha-numeric characters and are of a size permitting only one character at a time to be fully presented or registered in the window. For the purpose of this exposition, the symbols in the embodiment which are marked on the drum's periphery are the ten decimal numerals 0, 1, 2 . . . 9, the plus sign (+), and the minus sign (−). The permanent magnet is rigidly attached to the drum so that the two members constitute a rotor that turns as an inegral unit. The drum has a cenral aperture 15 which permits the rotor to be mounted over shaft 11. When so mounted, the drum encircles the toroidal stator whereas the magnet is within the enclosure of the toroidal stator. Where the indicator is required to respond rapidly, the inertia of the rotor is minimized by employing a drum of low mass. To retain the rotor so that it cannot slip off the shaft, a groove is provided near the shaft's end for accommodating a C-shaped lock member 16. The shaft has an enlarged portion 11*a*, best shown in FIG. 3, which provides a shoulder against which hub 13 bears to thereby position the rotor so that the permanent magnet is aligned with the core 9 of the stator. In more sophisticated embodiments of the invention, self-aligning jewelled bearings or ball bearings can be employed to facilitate turning of the rotor.

FIG. 4 depicts, in schematic form, the toroidal stator used in the embodiment of FIG. 2. The toroidal stator employs an annular ferromagnetic core 9 upon which are arranged windings W1, W2, W3, W4, W5, and W6. In the schematic diagram the windings are illustrated as being disposed either inside or outside the annulus; in the actual apparatus the windings are mounted on and encircle the annular core. Each of the windings has two sections connected to be simultaneously electrically energized and the winding sections are arranged to cause the magnetic flux to be forced out of the core to establish an external magnetic field that extends diagonally across the core.

In FIG. 5, for simplicity, only winding W1 is shown on core 9. The winding has two sections W1A and W1B which encircle the core and are connected so that both sections are simultaneously energized when an electrical potential is applied at terminal $2^0$. Although the sections of the winding are illustrated as being connected in parallel, they may be connected in series and yet attain the same result. The sections, whether connected in series or in parallel, are arranged so that when electrically excited by a voltage applied at terminal $2^0$, the current flow in section W1A establishes a magnetic flux in core 9 whose direction is counter to the direction of the magnetic flux established by section W1B. Assuming that section W1A causes its magnetic flux to flow clockwise as indicated by the M arrows in FIG. 5, then the magnetic flux established by the electrical current in section W1B flows in the counterclockwise direction as indicated by the N arrows. Because of the direction of the fields established by the two sections of winding W1, the magnetic flux is forced out of the core as depicted by the stippling in FIG. 5 and extends diagonally across the annular core. The external magnetic field can be represented by the vector A whose direction is the direction of the external field and whose length is a measure of the external field's magnetic intensity. In the absence of any other external magnetic field, the permanent magnet of the rotor, indicated in phantom in FIG. 5, is constrained to rotate into alignment with the A vector. When so aligned, one of the symbols on the periphery of the drum is present in the window of the indicator.

Because energization of winding sections W1A and W1B cause magnetic vector A to be established, winding W1 is denoted the A winding. Similarly, energization of winding sections W2A and W2B cause the establishment of magnetic vector B and winding W2 is therefore denoted the B winding. Winding W3 is denoted the C winding because simultaneous electrical excitation of sections W3A and W3B establish magnetic vector C. Winding W4 is denoted the D winding as its sections W4A and W4B, when electrically energized, establish magnetic vector D. Winding W5 is, in like manner denoted as winding E to mark its association with the E vector and winding W6 is denoted the F winding to fix its association with the F magnetic vector.

The A winding can be individually energized by an electrical signal impressed at terminal $2^0$. The B and C windings, however, are connected to terminal $2^1$ whereby both of those windings are simultaneously electrically energized by a signal applied to that terminal. Windings D and E, similarly, are both connected to terminal $2^2$ for simultaneous electrical excitation. A signal applied at terminal $2^3$, however, causes only the F winding to be energized. The stator of FIG. 4, because it has four input terminals ($2^0$, $2^1$, $2^2$, and $2^3$) is particularly suited to directly accept a four bit binary code.

Preferably, windings W1, W2, W3, W4, W5, and W6 are constructed so that vectors A, B, C, D, E, and F are of the same magnitude. It is not essential to the invention, however, that all those magnetic vectors be of equal magnitude. What is essential to the embodiment here described is that vector A be equal and opposite to vector D, that vector B be equal and opposite to vector E, and that vector C be equal and opposite to vector F. For purposes of exposition it is assumed that vectors A, B, C, D, E, and F are all equal in magnitude and they are so depicted in the drawings.

Referring to FIG. 6, the standard binary code is tabulated with respect to its decimal equivalents. The normal standard binary code for the decimal 0 is 0000. In the tabulated code of FIG. 6, the normal code for the decimal 0 has been replaced by 1011; the + symbol is equivalent to 1101; and the − symbol is equivalent to 1110. The bits in the code are tabulated under columns headed $2^0$, $2^1$, $2^2$, and $2^3$ and for each decimal digit or other symbol there is a four bit code. For example, the decimal digit 3 is represented by having the $2^0$ and $2^1$ bits valued at ONE and the $2^2$ and $2^3$ bits valued at ZERO. When the code is in the form of electrical signals, a bit having a value of ONE is customarily represented by a designated electrical voltage, for example +24 volts, whereas the value of ZERO is represented by ground potential or the absence of electrical voltage.

Where the coded electrical signals tabulated under the columns headed $2^0$, $2^1$, $2^2$, and $2^3$ are applied to the correspondingly designated terminals in FIG. 4, the windings under the column headings are energized if the bit is a ONE, whereas the windings are unenergized if the bit is a ZERO. For example, the B and C windings are simultaneously electrically excited where the $2^1$ bit is a ONE whereas both of those windings are simultaneously unenergized where the $2^1$ bit is a ZERO. The B and C windings, because of their common connection to the $2^1$ terminal of FIG. 4, must be activated together. Similarly, the D and E windings, which have a common connection to the $2^2$ terminal, are excited at the same time when the applied 22 signal is a ONE.

From FIG. 4 it is apparent that vectors A and D are equal and opposite, that vectors B and E are equal and opposite, and that vectors C and F are equal and opposite. When ONE signals are simultaneously applied to the $2^0$ and $2^2$ terminals, the magnetic flux due to the current flowing in the A winding is opposed by the magnetic flux due to the current flowing in the D winding, wherefore, only the magnetic flux induced in the core by the current flowing in winding E is effective to establish a magnetic field and that magnetic field is represented by the E vector. Although no magnetic fields corresponding to magnetic vectors A and D are actually established, applying ONE signals simultaneously to the $2^0$ and $2^2$ terminals has the same effect as is brought about by the A and D vectors cancelling each other. Similarly, where ONE signals are concurrently applied to the $2^1$ and $2^3$ terminals, the C and F vectors can be considered to cancel each other and only the B vector is effective. Where ONE signals are concurrently applied to terminals $2^1$ and $2^2$, the B and E vectors can be deemed to cancel, but the C and D vectors remain effective and their resultant is the vector CD. Thus, by a process of magnetic vector subtraction, vectors E, B, and CD are made effective.

The vector diagram of FIG. 7 shows the effective magnetic field vectors that result when signals coded according to the table of FIG. 6 are applied to the $2^0$, $2^1$, $2^2$ and $2^3$ terminals of the FIG. 4 stator. Each of those vectors represents a discretely oriented magnetic field having the direction of its vector. Vector A, for example, represents the magnetic field that is established by the stator when decimal numeral 1 is to be displayed in the window of the indicator's housing; vector BC represents the magnetic field that is established when decimal numeral 2 is to be displayed, vector ABC represents the magnetic field that is established when decimal numeral 3 is to be displayed; and so on. Since the binary ONE corresponds, for the purpose of exposition, to an electrical signal of +24 volts and the binary ZERO corresponds to an electrical signal at ground potential, the decimal digit 1 is displayed by the rotor when the A winding is energized by a ONE signal to establish the A vector; the decimal digit 2 is displayed in the window of the indicator when the B and C windings are simultaneously energized by a ONE signal applied at the $2^1$ terminal; the decimal digit 3 is displayed in the window of the indicator when the A, B, and C windings are simultaneously energized by ONE signals to establish the ABC vector; etc. The decimal numerals 0, 1, 2 . . . 9 and the + and − symbols can be displayed by energizing one, two, or, at most, three of the four terminals $2^0$, $2^1$, $2^2$, and $2^3$. In no case are all four terminals energized by ONE signal because such a set of signals results in the subtraction of all the magnetic vectors and, consequently, no discretely oriented magnetic field is established.

The sets of binary signals for the decimal numerals 2, 3, 4, and 9 cause vectors BC, ABC, DE and AF, respectively, to be established. Each of those four vectors is the resultant of the addition of two or more vectors. Vector BC, for example, is the resultant of the addition of vector B and vector C, as indicated by the diagram in FIG. 8 where vectors B and C are shown by solid line arrows and the resultant is shown by the broken line arrow.

The sets of binary signals for decimal numerals 5 and 7 and for the − symbol cause vectors ADE, ABCDE, and BCDEF, respectively, to be established. Each of those three vectors is the resultant of the subtraction of two or more vectors. For example, vector ABCDE is the resultant of the subtraction of vector A from vector D and the subtraction of vector B from vector E, which, thus, leaves the vector C as the resultant. As another example, vector ADE is the resultant of the subtraction of vector A from vector D which thus leaves vector E as the resultant.

The sets of binary signals for decimal numerals 0 and 6 and for the + symbol cause vectors ABCF, BCDE, and ADEF, respectively, to be established. Each of those vectors is the resultant of the cancellation by subtraction of two vectors and the addition of the remaining two vectors. For example, vector ADEF is the resultant of the cancellation by subtraction of vectors A and D and the addition of remaining vectors E and F.

The use of windings which all have the same ampere turns ratio and the arrangement of those windings as depicted in FIG. 4 enables the stator to establish the twelve magnetic field vectors shown in FIG. 7. Because of the symmetry, those vectors are spaced at 30° intervals around the annular core. The rotor 10 is constrained upon the establishment of any one of the magnetic fields represented by the vectors to rotate until the permanent magnet 12 is aligned with the magnetic field. In the aligned condition, one of the symbols on the rotor's drum is presented in the window of the indicator. The rotor can, therefore, be brought into aligned positions at 30° intervals. Because of the 30° separation, the symbols on the drum can all be of the same size as they are spaced at regular intervals around the drum's periphery. This permits symbols of the maximum size to be used on the drum with the assurance that each symbol will fit in the window.

Although all the windings in the FIG. 4 stator are depicted as connected to ground, a different arrangement, shown in FIG. 9, can be utilized. In the FIG. 9 arrangement the A and D windings are connected to place section W1A in series with section W4B and to place section W4A in series with section W1B; the B and E windings are connected to place section W2A in series with section W5B and to place section W5A in series with section W2B; similarly, windings C and F are connected to place their sections in series in like manner. Considering only the A and D windings, if the signals at terminals $2^0$ and $2^2$ are both ZERO or both ONE, there is no potential difference across the windings and consequently those windings are not electrically excited. Where a ONE signal is impressed at terminal $2^0$ and a ZERO is present at terminal $2^2$, the current flow in windings A and D is in the direction causing their magnetic fields to add and establish the A vector. Where the signals are reversed so that the ONE signal is applied at terminal $2^2$ and the ZERO signal is applied as terminal $2^0$, the current flow in windings A and D establish the D vector. In the embodiment of FIG. 9, there are twice as many active turns in the windings because the A and D windings are effectively in series. To establish magnetic vectors of equal magnitude, the windings employed in the FIG. 9 arrangement need have but about half the number of ampere turns used in the windings of the FIG. 4 stator.

In the arrangement depicted in FIG. 4, the simultaneous application of ONE signals to terminals $2^0$ and $2^2$ results in the flow of current in both the A and D windings, whereas in the FIG. 9 arrangement the simultaneous application of ONE signals to terminals $2^0$ and $2^2$ does not cause current to flow in the A and D windings. In the embodiment of FIG. 4, the currents flow in the A and D windings in different directions and therefore the net magnetic flux induced in the core is zero. In the embodiment of FIG. 9, in contrast, the ONE signals at terminals $2^0$ and $2^2$ in effect cancel and there is no current flow.

It should be realized that as sections W1A and W4B of FIG. 9 are serially connected, they are in effect a single winding which is in parallel across terminals $2^0$ and $2^2$ with the single winding formed by W4A and W1B. Those windings can establish either the A or D magnetic vector but not both together. Similarly, sections W2A and W5B form a single winding and in conjunction with sections W5A and W2B, which act as a single winding, can establish either the B or the E magnetic vector. The C and F magnetic vectors, in like manner, can be separately established by serially connected sections W3A and W6B which form a single winding that is effectively in parallel across terminals $2^1$ and $2^3$ with the single winding formed by W6A and W3B.

FIG. 10 depicts a scheme for serially connecting the windings of the toroidal stator to produce the same result as the FIG. 9 stator. In the FIG. 10 stator, all the windings shown are disposed upon and encircle annular ferromagnetic core 9. Winding AD1 is connected in series with winding AD2 between terminals $2^0$ and $2^2$. Those windings are arranged so that when they conduct current from terminal $2^0$ to terminal $2^2$, a magnetic field represented by vector A is produced. Where the current flow in those windings is from terminal $2^2$ to terminal $2^0$, a magnetic field represented by vector D is established. Winding BE1 is in series with winding BE2 and those windings cause magnetic field vector B to be established when current flows through those windings from terminal $2^1$ to terminal $2^2$; where the direction of current flow in those windings is reversed, a magnetic field represented by vector E is produced. Terminal $2^1$ is connected to terminal $2^3$ by serially joined windings CF1 and CF2. Windings CF1 and CF2 are arranged to establish either the magnetic field represented by vector C or the magnetic field represented by vector F, depending upon whether the direction of current flow in those windings is from terminal $2^1$ to terminal $2^3$ or is in the opposite direction.

In the operation of the FIG. 10 stator, a set of binary coded signals in accordance with the table in FIG. 6 is applied to termnals $2^0$, $2^1$, $2^2$, and $2^3$. Where the signal is a binary ONE, a positive potential of 24 volts is applied to the terminal; if the signal is a binary ZERO, however, the terminal is held at ground potential. Considering only terminals $2^0$ and $2^2$ and assuming that ZERO signals are simultaneously applied to them, it is evident, as both terminals are at ground potential, that no current flows through windings AD1 and AD2. A current will, however, flow through windings BE1 and BE2 if the signal at terminal $2^1$ is a ONE; if the signal at terminal $2^1$ is a ZERO, then no current flows in windings BE1 and BE2. Again considering only terminals $2^0$ and $2^2$ and assuming that ONE signals are simultaneously applied to those terminals, then no current flows in windings AD1 and AD2 because they are connected to terminals that are at the same potential. If the signal simultaneously applied at terminal $2^1$ is a ZERO, current flows from terminal $2^2$ to terminal $2^1$ through windings BE2 and BE1 whereby the E magnetic vector is established.

Because of the manner in which the windings are connected in the FIG. 10 stator, a ONE signal applied at terminal $2^0$ is in effect cancelled, insofar as windings AD1 and AD2 are concerned, by a ONE signal applied at terminal $2^2$. Windings AD1 and AD2, therefore, can establish either the A magnetic vector or the D magnetic vector, but cannot establish both at the same time. Similarly, as concerns windings BE1 and BE2, a ONE signal applied at terminal $2^1$ is effectively cancelled by a ONE signal applied at terminal $2^2$. The simultaneous application of ONE signals at terminals $2^1$ and $2^3$ likewise are mutually cancelled insofar as windings CF1 and CF2 are concerned. The signal cancellation has the same effect as the subtraction of magnetic vectors. That is, the effect of applying ONE signals simultaneously to terminals $2^0$ and $2^2$ is equivalent to causing vectors A and D to cancel each other, the effect of applying ONE signals simultaneously to terminals $2^1$ and $2^2$ is equivalent to causing vectors B and E to be cancelled, and the effect of applying ONE signals simultaneously to terminals $2^1$ and $2^3$ is equivalent to causing vectors C and F to be cancelled.

The stator of FIG. 10 is a simpler structure than the stator of FIG. 4 and yet produces all the vectors of FIG. 7.

FIG. 11 depicts, in schematic form, a stator that may be used in the invention in place of the toroidal type of stator. The core 10 of the stator shown in FIG. 11 is an annulus, of ferromagnetic material, having six poles P1, P2, P3, P4, P5, P6 extending radially inward. Preferably the poles are identical and are encircled by six identical windings W1, W2, W3, W4, W5, W6 so that the magnetic field established by the electrical energization of any one winding is equal in intensity to the magnetic field established by any other of the windings. For convenience, pole P1 is herein denoted as the A pole and its winding W1 is denoted as the A winding. Assuming that energization of winding W1 causes the tip of radial pole P1 to be a north magnetic pole, then every other radial pole becomes a south magnetic pole and the flux of the magnetic field produces the approximate pattern indicated by stippling in FIG. 12. The vector A of FIG. 11 then represents the direction and magnitude of the magnetic field established upon energization of the A winding. Similarly, pole P2 is denoted the B pole, its winding W2 is denoted the B winding, and the B vector represents the magnetic field established by energization of the B winding. Pole P3 is denoted the C pole, its winding W3 is denoted the C winding, and the C vector represents the magnetic field established by energization of the C winding. Pole P4 and winding W4 are, in the same manner, associated with the D vector; pole P5 and its winding W5 are associated with the E vector; and pole P6 and its winding W6 are associated with the F vector.

The A winding can be individually energized by an electrical signal applied to terminal $2^0$. The B and C windings, however, are connected to terminal $2^1$ so that an electrical signal applied to that terminal causes both windings to be simultaneously electrically energized. Windings D and E, similarly, are both connected to terminal $2^2$ whereby a signal applied at that terminal causes both of the windings to be simultaneously energized. A signal applied at terminal $2^3$, however, causes only the F winding to be energized. Where electrical signals coded in accordance with the table of FIG. 6 are applied to the designated terminals $2^0$, $2^1$, $2^2$, and $2^3$ of the FIG. 11 stator, the magnetic field vectors shown in FIG. 7 are established.

FIG. 13 depicts a modified stator having twelve radial poles arranged symmetrically around the annular core. The stator of FIG. 13 is essentially the stator of FIG. 11 with the addition of six radial poles P7, P8, P9, P10, P11, and P12. In the FIG. 13 stator, there is a radial pole at each vector position shown in FIG. 7. That is, the A vector is aligned with pole P1, the ABCF vector is aligned with pole P8, vector ABC is aligned with pole P2, vector BC is aligned with pole P9, and so on. Windings W1, W2, . . . W6 are disposed on the same poles as in the FIG. 11 stator and the additional poles P7, P8 . . . P12 do not carry windings. The additional poles are not necessary to the operation of the indicator but provide a convenient way for utilizing a rotor employing a bent permanent magnet. The bent permanent magnet M2, indicated in phantom in FIG. 13, is effective in assuring that the rotor will turn when required to move from one position to an 180° opposite position. The use of a bent magnet is more fully disclosed in U.S. patent application Serial No. 344,337, filed February 12, 1964, by Elliot R. Lang. In lieu of employing a bent magnet, the tips of the pole pieces can be shaped as taught in U.S. Patent No. 3,118,138 and a more conventionally shaped magnet may be used on the rotor. It has been found that the use of shaped poles in conjunction with a bent magnet rotor can yield results that are superior to the results obtained when the two are not conjoined.

The symmetrical radial pole stator illustrated in FIG. 14 is another modification of the FIG. 11 stator. The cores of the two stators are identical inasmuch as both are rings having symmetrically disposed, radial, inward projecting poles P1, P2, P3, P4, P5 and P6. The stators of FIGS. 11 and 14 essentially differ only in the manner in which the windings are arranged on the radial poles. In the FIG. 11 embodiment, each of the windings W1, W2, W3, W4, W5 and W6 is disposed around a different one of the radial poles, whereas in the FIG. 14 stator each winding has two sections, the two sections being disposed around diagonally opposite poles. For clarity, only three of the windings, W1, W4, and W5 are illustrated in FIG. 14. Winding W1 has a section W1A arranged around radial pole P1 and a second section W1B arranged around diagonally opposite pole P4. The two sections of the windings are depicted as being connected in series although they may be connected in parallel without a material change occurring in the invention. The two sections of winding W1 are arranged so that if a ONE signal is impressed upon terminal $2^0$ in a manner causing pole P1 to be a north magnetic pole, then the current flowing in section W1B is in the direction causing pole P4 to be a south magnetic pole. The two energized sections of winding W1, thereby establish a strong magnetic field, represented by vector A in the FIG. 7 diagram, between poles P1 and P4. Winding W4, similarly, has a section W4A arranged around radial pole P4 and another section W4B disposed around diagonally opposite pole P1. Winding W4 is connected to terminal $2^2$, and the two sections, W5A and W5B of winding W5 are disposed respectively upon poles P5 and P2, and are also connected to terminal $2^2$. Ignoring winding W5 for the moment, where a ONE signal is applied to terminal $2^2$ and causes pole P4 to be a north magnetic pole, then the current flowing in section W4B is in the direction causing pole P1 to be a south magnetic pole. Assuming the ampere turns of winding section W1A to be equal to the ampere turns of winding section W4B and the ampere turns of winding sections W4A and W1B to be the same, when ONE signals are simultaneously applied to terminals $2^0$ and $2^2$, the magnetizing force due to the current flowing in winding W1 is opposed by the magnetizing force due to the current flowing in winding W4. As the two forces are equal in magnitude and opposite in direction, those forces cancel each other so that the only appreciable magnetic field is the one established by the current flowing in winding W5. In the diagram of FIG. 7, the vector ADE represents the magnetic field established by applying ONE signals to the terminals $2^0$ and $2^2$ of the FIG. 14 stator. Any of the magnetic fields represented by the vectors depicted in FIG. 7 can be established by the stator of FIG. 14. The arrangement of windings in the manner shown in FIG. 14 is preferred to the winding arrangement depicted in FIG. 11 because a marked improvement in the operation of the indicator is obtained through the use of a two section winding.

The stator depicted in FIG. 15 is a modification of the FIG. 11 stator in that the FIG. 15 stator employs a different arrangement of windings. The windings W1, W2, W3, W4, W5, and W6 of both of those stators are mounted respectively upon radial poles P1, P2, P3, P4, P5, and P6. In the FIG. 15 stator, however, windings W1 and W4 are connected in series between terminals $2^0$ and $2^2$, windings W2 and W5 are serially connected between terminals $2^1$ and $2^2$, and windings W3 and W6 are serially connected between terminals $2^1$ and $2^3$.

To illustrate the operation of the FIG. 15 stator, it is here assumed that ZERO signals are applied to the $2^1$ and $2^3$ terminals while ONE signals are simultaneously applied to the $2^0$ and $2^2$ terminals. As ZERO is represented by ground potential, terminals $2^1$ and $2^3$ are grounded. A ONE signal, in contrast, is represented by +24 volts; terminals $2^0$ and $2^2$ therefore are at a positive potential of 24 volts. Because both terminals $2^0$ and $2^2$ are at the same positive potential, no current flows in winding W1 or in winding W4. Similarly, because terminals $2^1$ and $2^3$ are both at ground potential, no current flows in windings W3 or W6. A current, however, does flow from terminal $2^2$ through windings W5 and W2 to terminal $2^1$. That current causes the magnetic vector ADE of FIG. 7 to be established. Any of the magnetic vectors depicted in FIG. 7 can be established by the stator of FIG. 15 when signals in accordance with the table of FIG. 6 are applied to the designated $2^0$, $2^1$, $2^2$ and $2^3$ terminals.

The stator of FIG. 15, in establishing magnetic vector ADE, did not actually set up magnetic fields corresponding to vectors A and D. Rather, the ONE signal at terminal $2^0$ in effect nullified the ONE signal at terminal $2^2$ so that no current flowed through windings W1 and W4 whereby only the current flowing in windings W5 and W2 was effective in establishing the E magnetic vector. Although no magnetic fields corresponding to vectors A and D were actually established, the simultaneous application of ONE signals to terminals $2^0$ and $2^2$ had the same effect as though vectors A and D cancelled each other. Similarly, where ONE signals are concurrently applied to the $2^1$ and $2^3$ terminals of the FIG. 15 stator, the C and F vectors can be considered to cancel each other and only the B vector is effective. Where ONE signals are concurrently applied to terminals $2^1$ and $2^2$, the B and E vectors can be deemed to cancel each other, while the C and D vectors remain effective and provide resultant vector CD. Thus, the stator of FIG. 15 by a process analogous to vector subtraction can cause only vector E or B or CD to be effective.

The binary code for the decimal numeral 0 tabulated in FIG. 6 is 1011. As the standard four bit binary code for decimal numeral 0 is 0000, the tabulated code, in effect, employs a "false" code for that decimal numeral. Where it is desired to have the indicator respond to the "true" binary code for decimal 0, that is, where it is desired to have the indicator display the symbol 0 in the window when all the inputs to the stator are ZERO signals, then a bar magnet 18 can be secured as shown in phantom in FIG. 2 upon end plate 7A. Bar magnet 18 is disposed so that when the ellipsoidal magnet 12 of the rotor is aligned with the bar magnet the numeral 0 is presented in the window of the indicator. Bar magnet 18 has enough of a magnetic field associated with it to cause magnet 12 to turn into alignment with that field when none of the stator windings are electrically excited. However, when any of the windings of the stator are energized, the magnetic field set up by the stator is so strong as to substantially mask the magnetic field of bar magnet 18 and, therefore, the rotor turns to align its ellipsoidal magnet 12 with the field of the stator and is virtually unaffected by the masked magnetic field.

The permanent bar magnet 18 is used in those indicators which are intended for "continuous duty" operation. By "continuous duty" it is meant that the binary signals are continuously applied to the inputs of the indicator and that those signals change only when a different symbol is to be displayed in the indicator's window. Where the indicator is intended for intermittent duty or is intended to be used with "pulse" binary signals, then permanent bar magnet 18 cannot be employed as it causes the rotor to turn to the decimal 0 position whenever the stator's windings are unenergized. In those situations where the indicator is intended for intermittent duty or is intended to respond to pulsed binary signals, in lieu of using permanent bar magnet 18, an electromagnet can be employed which is caused to be energized when all the inputs to the stator are binary ZERO signals and which is de-energized in the inter pulse interval.

In indicators which are intended for use with pulsed binary signals, it is customary to provide those indicators with a "memory" which causes the symbol last displayed in the indicator to be retained in the window even though the pulsed binary signals have decayed. The "memory," in effect, retains the last displayed symbol in the window until a new set of binary signals is applied to the indicator which commands a different symbol to be displayed.

A memory suitable for use with this invention is described in U.S. Patent No. 2,943,313. That patent teaches the use of static magnetizable elements arranged to pull the rotor to an "offset" position when the stator is de-energized. That is, when the stator's windings are electrically energized, the rotor aligns itself with the magnetic field established by the stator, as for example as is shown in FIG. 16A where the rotor's magnet 12 is aligned with vector A. Upon collapse of the stator's magnetic field, the magnet 12 is drawn into an "offset" position where it is aligned with the nearest magnetizable elements 19 and 20, as in FIG. 16B. The magnetic detent elements 19 and 20 hold the rotor in the offset position until the stator is again energized by binary coded signals. Thus, two closely adjacent, magnetically determined stable positions are available for the rotor, one position being fixed by the stator when its windings are electrically excited, and the other position being fixed by static magnetizable detent elements which coact with the rotor's permanent magnet to determine the "offset" position of the rotor when the stator is electrically unenergized.

Other ways of providing the indicator with a "memory" may be utilized in the invention. For example where the stator is of the radial pole type depicted in FIG. 13 the pole pieces may be shaped as disclosed by U.S. Patent No. 3,118,138 to provide the indicator with a memory.

The invention has been described as utilizing binary coded decimal input signals and providing twelve display positions. For illustrative purposes, the binary signals have been described as conforming to a modified standard binary code. It is apparent that the invention can easily be modified to respond to other binary codes, such as the "Gray binary code." Further, where more display positions are required, the stator can be modified by adding more windings and arranging those windings to accept a five or six bit set of coded signals. As a corollary, where fewer display positions are required, the stator can be modified to accept a three bit set of coded signals. The connections of the stator's windings, illustrated in the drawings, are exemplars only, as those windings can be connected in different arrangements to provide the same or analogous results.

The invention resides in the arrangement of windings whereby vector subtraction as well as vector addition is employed to establish discrete positions for the rotor. (Vector subtraction, as used herein, means the addition of vectors which extend in 180° opposite directions.) It is contemplated that the chief use of the invention will be as a binary code to decimal converter. The invention is not restricted to responding only to binary coded signals however, and it is obvious that the invention can be utilized to respond to electrical signals which can assume three or more values. That is, the invention can be constructed to respond to ternary signals, to quarternary signals, and even to signals of higher order.

In view of the multitude of ways in which the invention can be embodied, it is not intended that the scope of the invention be restricted to the precise structures illustrated in the drawings or described in the exposition. Rather it is intended that the scope of the invention be delimited by the claims appended hereto and that within that scope be included only those structures which in essence utilize the invention.

What is claimed is:

1. In a code converter of the type utilizing a stator for selectively establishing any one of a plurality of discretely oriented magnetic fields the stator having a ferromagnetic core, and a rotor having a magnet, the magnet being surrounded by the core, the rotor being mounted to permit the magnet to rotate into alignment with the discretely oriented magnetic field established by the stator, the improvement whereby the converter responds to a coded set of simultaneous electrical signals, each bit in the code being represented by a different signal of the set, the improvement residing in a plurality of electrically energizable windings mounted upon the stator's ferromagnetic core, means for applying the set of simultaneous electrical signals to the windings, and some of the windings being arranged to be energizable together by one signal of the set to cause those windings to be jointly effective in the establishment of the stator's discretely oriented magnetic field and being arranged so that another signal in the set can cause one of those windings to be ineffective in the establishment of the stator's discretely oriented magnetic field.

2. A code converter according to claim 1 wherein the improvement further resides in utilizing a toroid for the ferromagnetic core of the stator, and arranging each winding in two sections upon the toroidal core to cause a magnetic field to extend externally of the core when the winding is electrically energized.

3. A code converter according to claim 1 wherein the improvement further resides in providing the stator's ferromagnetic core with a plurality of inwardly extending radial poles, at least two of the poles being diametrically opposite one another, and mounting the plurality of windings upon the radial poles.

4. In a code converter of the type utilizing a stator for selectively establishing any one of a plurality of discretely oriented magnetic fields, the stator having an annular ferromagnetic core, and a rotor having a magnet coupled to a drum, the rotor being mounted to permit the magnet to rotate into alignment with the discretely oriented magnetic field established by the stator whereby the drum is differently positioned for each different discretely oriented magnetic field established by the stator, the improvement whereby the converter responds to a set of simultaneous electrical signals coded in accordance with a binary system, each bit in the binary code being represented by a different signal in the coded set, the improvement residing in a plurality of windings disposed upon the stator's ferromagnetic core, means for impressing the coded set of simultaneous signals upon the windings, each different set of signals causing the stator to establish a differently oriented magnetic field, and some of the stator's windings being arranged to be energizable together by the same signal to cause those windings to be jointly effective in the establishment of the stator's discretely oriented magnetic field and being arranged so that another signal in the set can cause one of those windings to be ineffective in the establishment of the stator's discretely oriented magnetic field.

5. A code converter according to claim 4, the improvement further including a plurality of input signal terminals, each signal of the coded set being applied to a different input terminal, each winding having its opposite ends connected to two different input signal terminals, and at least one input terminal being connected to the ends of two windings.

6. A code converter according to claim 4, the improvement further residing in the ferromagnetic core being an annulus having a plurality of radially inwardly extending poles, the poles being arranged around the core so that each pole is diametrically opposite another pole, each winding being disposed upon a different radial pole, the windings on opposite poles being serially connected, each serially connected pair of windings having two signals of the set impressed at opposite ends of the serial windings, and at least one signal of the set being impressed upon the ends of two windings.

7. A code converter according to claim 4, the improvement further residing in arranging each winding in two sections upon the stator's annular ferromagnetic core to cause a magnetic field to extend externally of the core when the winding is electrically energized, and disposing the windings upon the core so that the magnetic field of one energized winding can be nullified by the equal and opposite magnetic field of another energized winding.

8. A code converter according to claim 4, the improvement further residing in the stator's ferromagnetic core being a toroid, each winding being disposed around the toroid and having two sections which cause a magnetic field to extend externally of the core when the winding is excited by the flow in it of electric current, each winding having two signals of the set applied to opposed ends of the winding, and at least one signal of the set being impressed upon the ends of two windings.

No references cited.

MAYNARD R. WILBUR, *Primary Examiner.*

W. J. KOPACZ, *Assistant Examiner.*